United States Patent
Bengtsson et al.

(10) Patent No.: US 9,590,743 B2
(45) Date of Patent: Mar. 7, 2017

(54) BODY AREA NETWORK SIGNAL DISCRIMINATION

(71) Applicant: Sony Mobile Communications Inc., Tokyo (JP)

(72) Inventors: Erik Bengtsson, Eslov (SE); Henrik Bengtsson, Lund (SE); Thomas Bolin, Lund (SE); Peter Isberg, Lund (SE); Magnus Midholt, Lund (SE); Ola Thorn, Limhamn (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/725,440

(22) Filed: May 29, 2015

(65) Prior Publication Data

US 2016/0294487 A1 Oct. 6, 2016

Related U.S. Application Data (63) Continuation of application No. PCT/IB2015/052334, filed on Mar. 30, 2015.

(51) Int. Cl.
*H04B 5/00* (2006.01)
*H04B 7/00* (2006.01)
(Continued)

(52) U.S. Cl.
CPC ...... *H04B 13/005* (2013.01); *H04W 72/0406* (2013.01); *H04W 76/02* (2013.01)

(58) Field of Classification Search
CPC .............. H04B 13/005; H04B 7/18526; H04B 7/18589; H04W 72/0406; H04W 76/02; H04W 76/04; H04W 80/10
See application file for complete search history.

(56) References Cited

U.S. PATENT DOCUMENTS

| 9,386,479 B2* | 7/2016 | Douglas | H04W 28/10 |
| 2009/0275293 A1* | 11/2009 | Ida | H04B 13/005 455/73 |

(Continued)

FOREIGN PATENT DOCUMENTS

EP 2 413 523 A1 2/2012

OTHER PUBLICATIONS

International Search Report an Written Opinion from counterpart International Application No. PCT/IB2015/052334, mailed Dec. 17, 2015.

*Primary Examiner* — Tilahun B Gesesse
(74) *Attorney, Agent, or Firm* — Tucker Ellis LLP (57) ABSTRACT

A method, system and devices provide for transmitting, by a first device, a body area network (BAN) session initiation signal indicating an availability to establish an on-body communication with a second device. At least one BAN acknowledgement signal is received by the first device from the second device. The first device determines whether one of the at least one BAN acknowledgement signal is received via conducting across a body. The first device proceeds with BAN session initiation based on determining that one of the at least one BAN acknowledgement signal is received via conducting across a body and terminates BAN session initiation based on not determining that one of the at least one BAN acknowledgement signal is received via conducting across a body.

13 Claims, 10 Drawing Sheets

(51) Int. Cl.
*H04B 1/38* (2015.01)
*H04B 13/00* (2006.01)
*H04W 72/04* (2009.01)
*H04W 76/02* (2009.01)

(56) References Cited

U.S. PATENT DOCUMENTS

| | | | | |
|---|---|---|---|---|
| 2010/0289673 | A1* | 11/2010 | Kim | H04B 13/005 341/20 |
| 2010/0298669 | A1 | 11/2010 | Ida | |
| 2014/0009262 | A1* | 1/2014 | Robertson | A61B 5/0006 340/5.52 |
| 2014/0320307 | A1* | 10/2014 | Matsuno | A61B 5/0002 340/870.07 |
| 2016/0057582 | A1* | 2/2016 | Kunitake | H04W 4/027 455/456.1 |

* cited by examiner

BODY AREA NETWORK SIGNAL DISCRIMINATION

TECHNICAL FIELD

The present disclosure relates generally to wireless communication devices, and particularly to wireless communication devices configured to communicate using the user's own body as a communication medium.

BACKGROUND ART

There is an emerging consumer market for certain devices that are used as companion products to smartphone devices. Their popularity can be traced, in part, to the variety of features they provide to a user. For example, one such device is a wearable device, such as a ring worn on the user's finger, a necklace, a watch, eyeglasses, a bracelet, or a wristband that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone, thereby permitting the user to bypass the manual entry of a predetermined unlock sequence associated with the smartphone.

Such features are already present on commercial products/devices. However, a common issue associated with these devices is that they either need a physical interface (e.g. a 3.5 mm audio plug, an Universal Serial Bus (USB), etc.) or some sort of wireless "local connectivity" (e.g., Bluetooth®, Wi-Fi, Near Field Communication (NFC), etc.), in order to transmit data between the devices. Such methods for communicating, however, can be cumbersome. Additionally, these types of communication may be a limiting factor that could constrain new features waiting to be implemented on such devices.

Body-coupled communication (BCC) is a communication in which the human body serves as a transmission medium. For example, a communication signal may travel on, proximate to, or in the human body. According to one known approach, this may be accomplished by creating a surface charge on the human body that causes an electric current and formation and re-orientation of electric dipoles of human tissues. A transmitter and a receiver are used to transmit a body-coupled signal and receive the body-coupled signal. There are a number of advantages related to body-coupled communication compared to other forms of communication, such as power usage, security, resource utilization, etc.

SUMMARY

One aspect of the present invention method includes transmitting, by a first device, a body area network (BAN) session initiation signal indicating an availability to establish an on-body communication with a second device; receiving, by the first device, at least one BAN acknowledgement signal from the second device; determining, by the first device, whether one of the at least one BAN acknowledgement signal is received via conducting across a body; proceeding, by the first device, with BAN session initiation based on determining that one of the at least one BAN acknowledgement signal is received via conducting across the body; and terminating, by the first device, BAN session initiation based on not determining that one of the at least one BAN acknowledgement signals is received via conducting across a body.

In accordance with another aspect, a device includes a body area network (BAN) communication interface; a memory, wherein the memory stores instructions; and a processor. The processor is configured to execute the instructions to: transmit, via the BAN communication interface, a BAN session initiation signal indicating an availability to establish an on-body communication with a second device; receive, via the BAN communication interface, at least one BAN acknowledgement signal from the second device; determine whether one of the at least one BAN acknowledgement signal is received via conducting across a body; proceed with BAN session initiation when it is determined that one of the at least one BAN acknowledgement signal is received via conducting across the body; and terminate BAN session initiation when it is not determined that one of the at least one of BAN acknowledgement signal is received via conducting across the body.

The features of the above-mentioned embodiments can be combined in any combinations.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As used herein, the term "communication device" includes any communication device that includes body coupled communication (BCC) capabilities. Examples of such devices may include any type of mobile phone, smartphone, laptop (such as standard, ultra portables, netbooks, Chromebook®, and micro laptops), handheld computers, portable digital assistants, tablet computers, touch pads, gaming devices, accessories to mobile phones, e.g. wearable communication devices in the form of headphones/-sets, visors/goggles, bracelets, wristbands, necklaces, watches, headbands, rings, etc.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Body Area Network (BAN) standards such as IEEE's 802.15.6 or Sony's CCCC are enabling the possibilities for commercialized BAN devices. The first BAN enabled devices have its background in the medical area, as BCC is a communication standard optimized for low power devices and operation on, in or around the human body.

Body Coupled Communications (BCC), also referred to as Body-Based Communication (BBC) or Near-Body Communication (NBC), has been developed as an alternative or supplement to short range radio frequency (RF) communication as a basis for Personal Area Network communication. BCC allows for an exchange of information between a plurality of devices that are in contact with or in very close proximity of a living body, or, in some instances, multiple living bodies. This can be achieved by the transmitting BCC-/BAN-antenna (also referred to as a contact) that provides a capacitive or galvanic coupling of low-energy electrical fields onto the body surface, i.e., leakage currents, with a small magnitude set to spread out over the human body. The small currents are then detected by a receiver BCC antenna (or contact), located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. As an additional advantage, power consumption of BCC-antennas is very low.

Although BAN signaling is intended to pass across body surfaces between BAN devices, it has been observed that the signals output by BAN transceivers may, in some instances be received over the air, such as when two (or more) BAN devices are physically close to each other during BAN signal transmission. In particular, signals output at a frequency of 40 MHz may be observed approximately 0.5 meters away over the air. In these instances, it is desirable, if not necessary, to accurately identify whether the signaling is a proper on-body BAN signal indicative of a BCC session or whether the signaling comprises a BAN signal erroneously received over the air from a nearby device.

Consistent with embodiments described herein, a BAN device may include a signal discrimination module for determining whether two devices that exchange or receive BAN signals are positioned on (or in very close proximity to) the same body. As described in detail below, the signal discrimination logic may make this determination in a number of different ways based on a time of receipt of respective BAN signals as well as a signal strength (or power) of the respective signals.

Figure 1A:
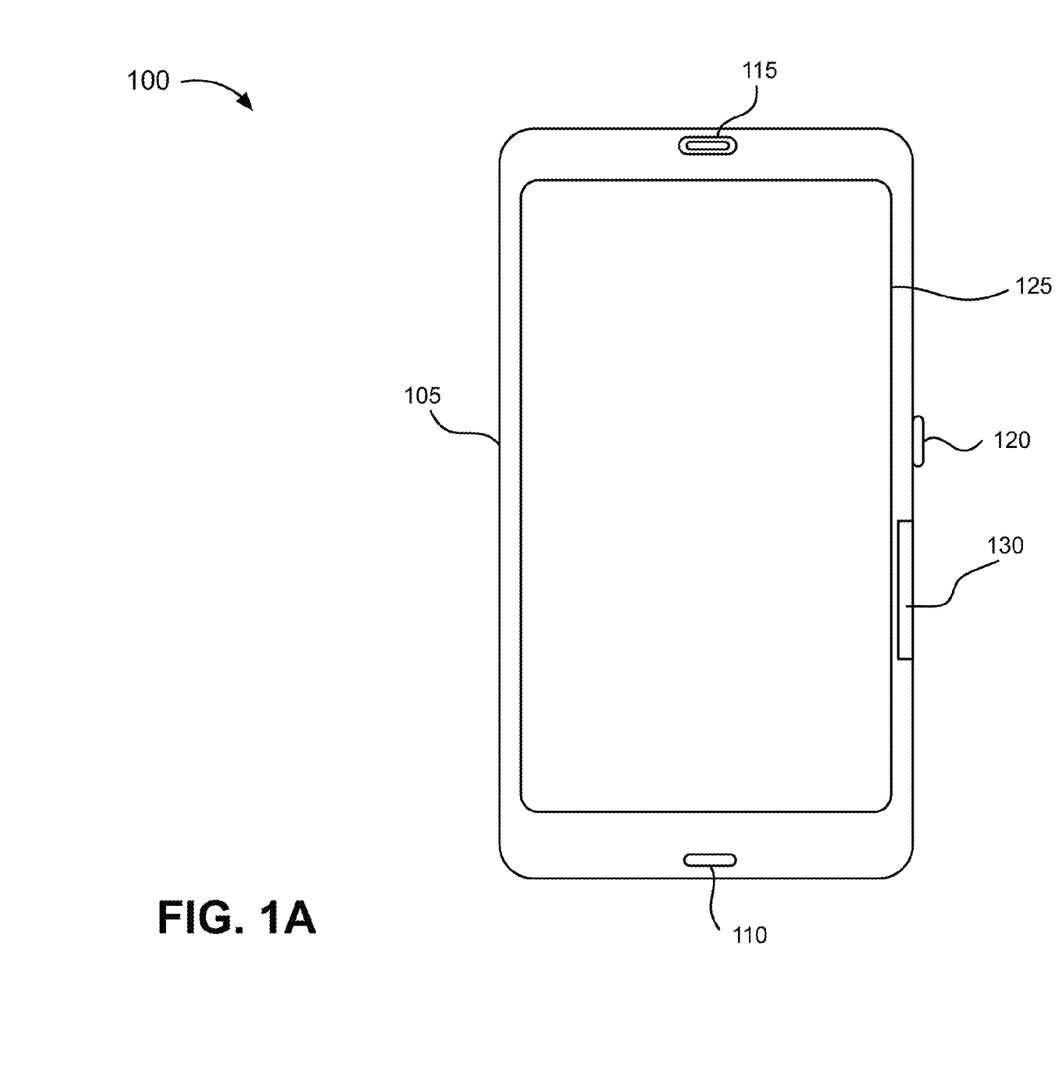
FIG. 1A is a diagram of an exemplary communication device consistent with embodiments described herein.

FIG. 1A is a diagram of an exemplary communication device 100 consistent with embodiments described herein. As described herein, communication device 100 is generally referred to below as a mobile phone or smartphone, although, as briefly described above, device 100 may include any device capable of BAN communications.

As shown in FIG. 1A, communication device 100 comprises a housing 105, a microphone 110, a speaker 115, a button 120, a display 125, and at least one BAN contact 130.

According to other embodiments, communication device 100 may comprise fewer components, additional components, different components, and/or a different arrangement of components than those illustrated in FIG. 1A and described herein. For example, communication device 100 may include a port (e.g., a headphone port, a Universal Serial Bus (USB) port, a High Definition Multimedia Interface (HDMI) port, or some other type of input port and/or output port, etc.), a camera, a keypad, a keyboard, a biometric reader (e.g., retina, etc), etc. Additionally, or alternatively, communication device 100 may take the form of a different configuration (e.g., a slider, a clamshell, a swivel, etc.) than the configuration illustrated in FIG. 1A. Also, according to some embodiments, BAN contact 130 may comprise a plurality of regions or may comprise an entirety of housing 105.

Housing 105 comprises a structure to contain components of communication device 100. For example, housing 105 may be formed from plastic, metal, or some other type of material. Housing 105 may support microphone 110, speaker 115, button 120, display 125, and BAN contact 130.

Microphone 110 is capable of transducing a sound wave to a corresponding electrical signal. For example, a user may speak into microphone 110 during a telephone call or to execute a voice command. Speaker 115 is capable of transducing an electrical signal to a corresponding sound wave. For example, the user may listen to music or listen to a calling party through speaker 115.

Button 120 provides an input to communication device 100. Button 120 may provide a single or dedicated function (e.g., power) or multiple functions. For example, button 120 may enable deactivation of display 125 as well completely powering on and off of communication device 100. Alternatively, button 120 may provide performing a camera function, volume control, etc. Button 120 may be a hardware button. For example, button 120 may be a push-button, a rocker style button, etc. Additionally, or alternatively, button 120 may be a capacitive-touch button.

Display 125 operates as an output component. For example, display 125 may comprise a liquid crystal display (LCD), a plasma display panel (PDP), a field emission display (FED), a thin film transistor (TFT) display, or some other type of display technology (e.g., organic LED (OLED), active matrix OLED (AMOLED), etc). Display 125 is capable of displaying text, pictures, video, images (e.g., icons, objects, etc.). Display 125 may also be capable of providing haptic or tactile feedback.

Additionally, display 125 may operate as an input component. For example, display 125 may comprise a touch-sensitive screen. Display 125 may be implemented using a variety of sensing technologies, such as capacitive sensing, surface acoustic wave sensing, resistive sensing, optical sensing, pressure sensing, infrared sensing, or gesture sensing. In such instances, display 125 may operate as a single-point input device (e.g., capable of sensing a single touch) or a multipoint input device (e.g., capable of sensing multiple touches that occur at the same time). Additionally, or alternatively, display 125 may comprise a touchless screen (e.g., having air-touch, air-gesture capabilities).

BAN contact 130 may include a conductive portion integrated within housing 105 and coupled internally to a BAN antenna, which in turn is coupled to a BAN transceiver, described below. As shown in FIG. 1A, BAN contact 130 may be provided in a region of communication device 100 that typically contacts a user during use of device 100. Further, as described above, BAN contact 130 may include multiple regions for further ensuring that at least one BAN contact 130 is in contact with the user, when the user possesses device 100.

Consistent with embodiments described herein, BAN contact 130 may include or communicate with a body sensor and a BAN electrode to determine on-body contact and transmit signals to/from the body. As described in additional detail below, in operation, the body sensor may enable a determination that communication device 100 is in contact with a human body, and the BAN electrode may form the medium through which BAN signals are output to and received from the user's body.

Figure 1B:
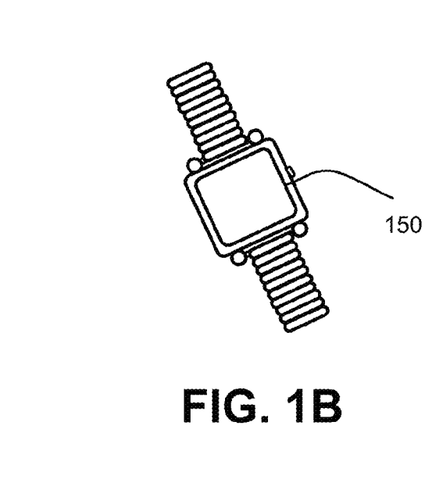
FIGS. 1B-1G are diagrams illustrating exemplary secondary BAN devices consistent with embodiments described herein.
Figure 1C:
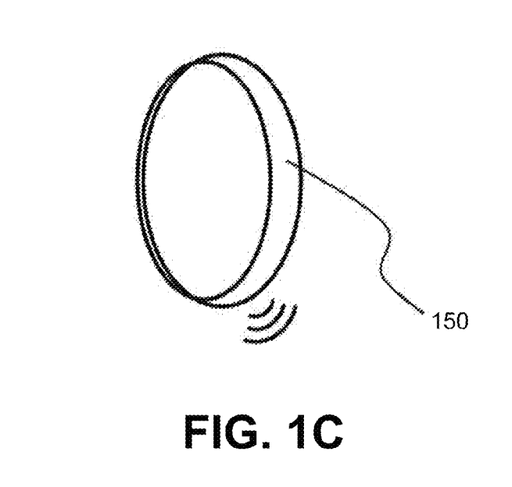
Figure 1D:
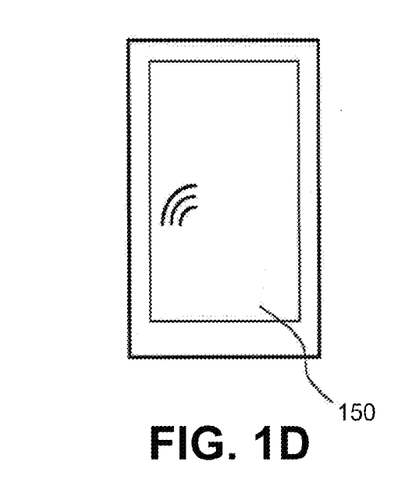
Figures 1E, 1F:
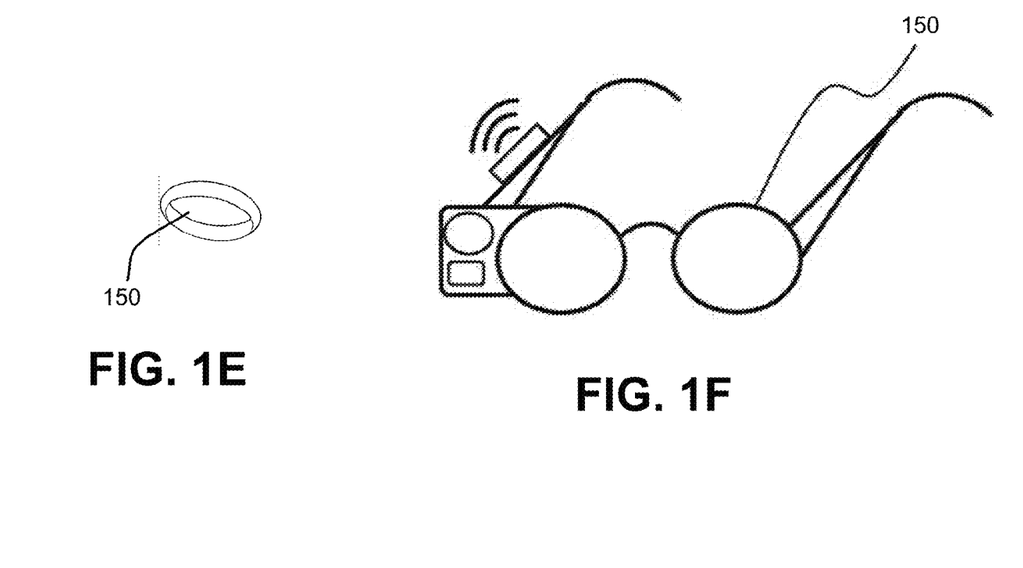
Figure 1G:
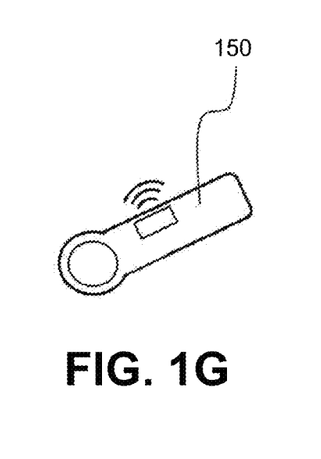

FIGS. 1B-1G are diagrams illustrating exemplary secondary BAN devices 150, also referred to as an accessory BAN device or a wearable BAN device. In general, a secondary BAN device 150 refers to a wireless communication device configured to be worn or touched by a person during use and which is further configured to communicate with communication device 100 via a BAN. Examples of such BAN enabled devices include a watch, as shown in FIG. 1B, a bracelet, as shown in FIG. 1C, a smartphone or tablet, as shown in FIG. 1D, a ring, as shown in FIG. 1E, a pair of eyeglasses, as shown in FIG. 1F, and as headset or earpiece, as shown in FIG. 1G. It should be understood that the provided examples are not exhaustive, and any suitable BAN enabled device may be used in accordance with embodiments described herein, and include alternatives, such as skin contact patches, headphones, necklaces, clothing, etc.

Figure 2:
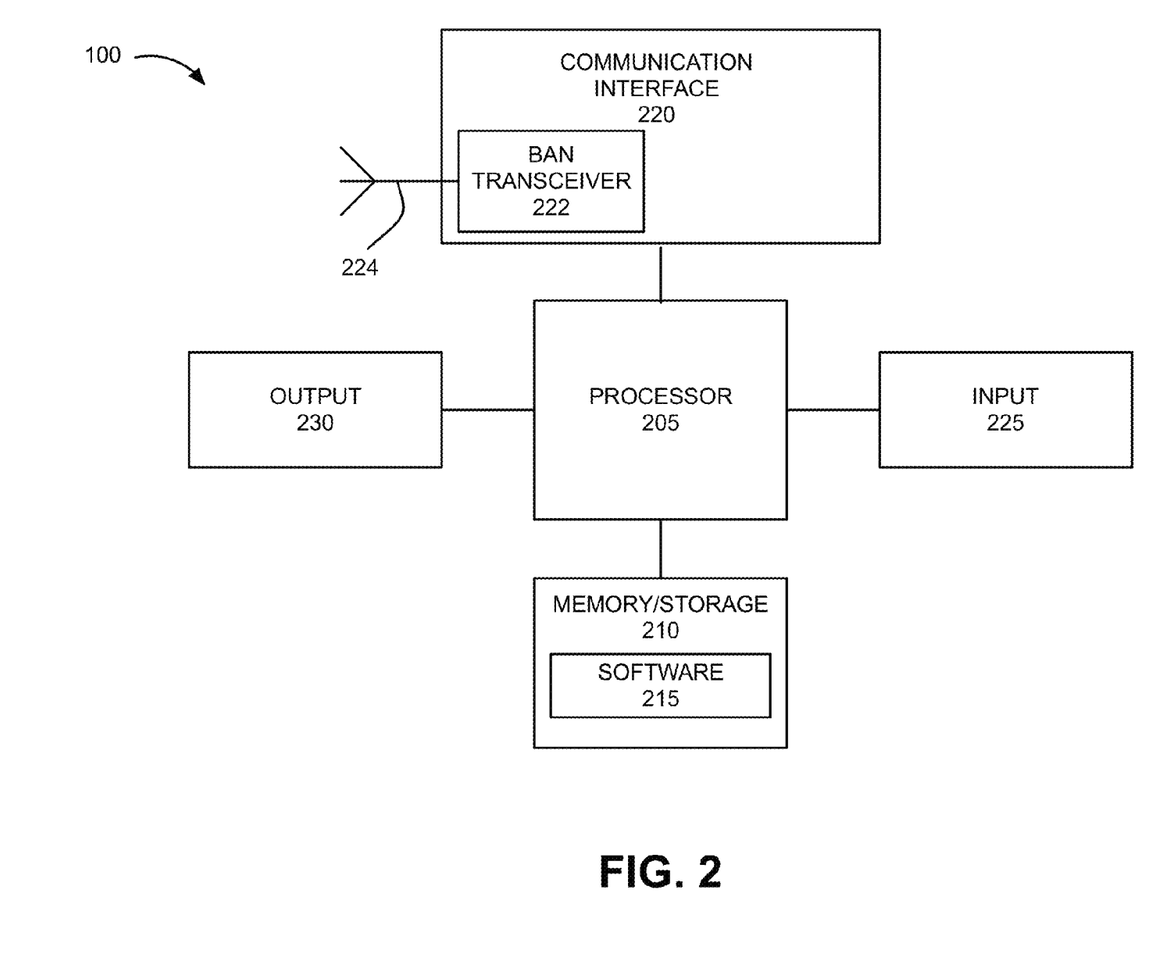
FIG. 2 is a diagram illustrating exemplary components of the communication device and secondary BAN device of FIGS. 1A-1G.

FIG. 2 is a diagram illustrating exemplary components of communication device 100 and secondary BAN device 150. As illustrated, communication device 100 includes a processor 205, a memory/storage 210, software 215, a communication interface 220, an input 225, and an output 230. According to other embodiments, communication device 100 and BAN device 150 may include fewer components, additional components, different components, and/or a different arrangement of components than those illustrated in FIG. 2 and described herein.

Processor 205 includes one or multiple processors, microprocessors, data processors, co-processors, and/or some other type of component that interprets and/or executes instructions and/or data. Processor 205 may be implemented as hardware (e.g., a microprocessor, etc.) or a combination of hardware and software (e.g., a system-on-chip (SoC), an application-specific integrated circuit (ASIC), etc.). Processor 205 performs one or multiple operations based on an operating system and/or various applications or programs (e.g., software 215).

Memory/storage 210 includes one or multiple memories and/or one or multiple other types of storage mediums. For example, memory/storage 210 may include a random access memory (RAM), a dynamic random access memory (DRAM), a cache, a read only memory (ROM), a programmable read only memory (PROM), flash memory, and/or some other type of memory. Memory/storage 210 may include a hard disk (e.g., a magnetic disk, an optical disk, a magneto-optic disk, a solid state disk, etc.).

Software 215 includes an application or a program that provides a function and/or a process. Software 215 may include device firmware, an operating system (OS), or a variety of applications that may execute on the devices 100/150. By way of example, depending on the implementation of communication device 100, the operating system may correspond to iOS, Android, Windows Phone, Symbian, or another type of operating system (e.g., proprietary, BlackBerry OS, Windows, Tizen, Linux, etc.), additional software 215 may comprise a telephone application, a multimedia application, an e-mail application, a contacts application, a calendar application, an instant messaging application, a web browsing application, a location-based application (e.g., a Global Positioning System (GPS)-based application, etc.), a camera application, etc.

According to embodiments described herein, software 215 includes one or more applications configured to support the exchange of information between communication device 100 and secondary BAN device 150. Furthermore, consistent with embodiments described herein, software 215, such as the OS or firmware executing on device 150, may be configured to discriminate between multiple received BAN signals to avoid erroneously transmitting or responding to BAN devices which are not on the same body as communication device 100.

Communication interface 220 permits communication device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, communication standards, and/or the like. In particular, as described above, communication interface 220 includes at least a BAN transceiver (or a discrete receiver and transmitter) 222 and BAN antenna 224 for interfacing with BAN contact 130 (i.e., the BAN electrode) to transmit and receive BAN signals from other BAN-enabled devices, such as secondary BAN device 150. In some embodiments, communication interface 220 includes other transmitters and transceivers to enable communication via other protocols, such as Bluetooth®, near field communication (NFC), Wi-Fi, as well as long range wireless communications, such as 3G, LTE (long term evolution), etc.

Input 225 permits an input into communication device 100. For example, input 225 may include a button, a switch, a touch pad, an input port, speech recognition logic, and/or a display (e.g., a touch display, a touchless display). As described above, according to embodiments described herein, input 225 includes at least one body sensor in BAN contact 130 (not shown in FIGS. 1B-1G). As generally shown in FIG. 1A, BAN contact 130 may be provided on a part of the device that is closest to the body part of the user, such as the side of mobile phone 100, the back of a watch or bracelet, the stem of a pair of eyeglasses, the earpiece portion of a headset, display 125, etc. In other embodiments, a larger portion of device 100 may be used as BAN contact 130, such as an entire housing 105, display 125, etc.

In some embodiments, BAN contact 130 may include any sensor configured to detect when the device 100/150 is in contact with a user's body. For example, such a sensor may comprise a "tremor sensor" configured to detect the tremors present in human muscles. As stated previously, such sensors are able to sense tremors within the 8-12 Hz range. However, other sensors are also possible, such as those that are configured to detect body temperature, blood flow, and pulse, for example. In other embodiments, the body sensor in BAN contact 130 may include an accelerator, an optical sensor, etc. In still other embodiments, the body sensor of BAN contact 130 includes a capacitive touch system. Such a capacitive touch system may have low power consumption (e.g., less than 30 Micro Amp), and a sensitivity range of 20-30 mm, such that the device may be may be loosely coupled around a body part, such as an arm, and still give a signal.

In still another embodiment, BAN contact 130 may include a combination of a capacitive touch system and an accelerometer. When BAN contact 130 is initially placed into contact with the user's body, the capacitive touch system will notify processor 205 that the device is on a body. Then, the accelerator initiates tremor detection to determine whether the starts to detect a tremor signal.

Notwithstanding the manner in which an on-body contact is determined, signals coming from the body sensor of BAN contact 130 may be received at the processor 205 and used as a trigger to activate the BAN interface to attempt to establish a BAN link with other body coupled devices. In other instances, contact signals from BAN contact 130 may be used in combination with user instructions.

Output 230 permits an output from communication device 100. For example, output 230 may include a speaker, a display, a light, an output port, a vibration device, and/or some other type of output component. In the case of secondary BAN device 150, in some instances, device 150 may not include an output 230, such as when device 150 comprises a ring.

Communication device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, communication device 100 may perform a process or a function based on the operation of hardware (processor 205, etc.).

Figure 3:
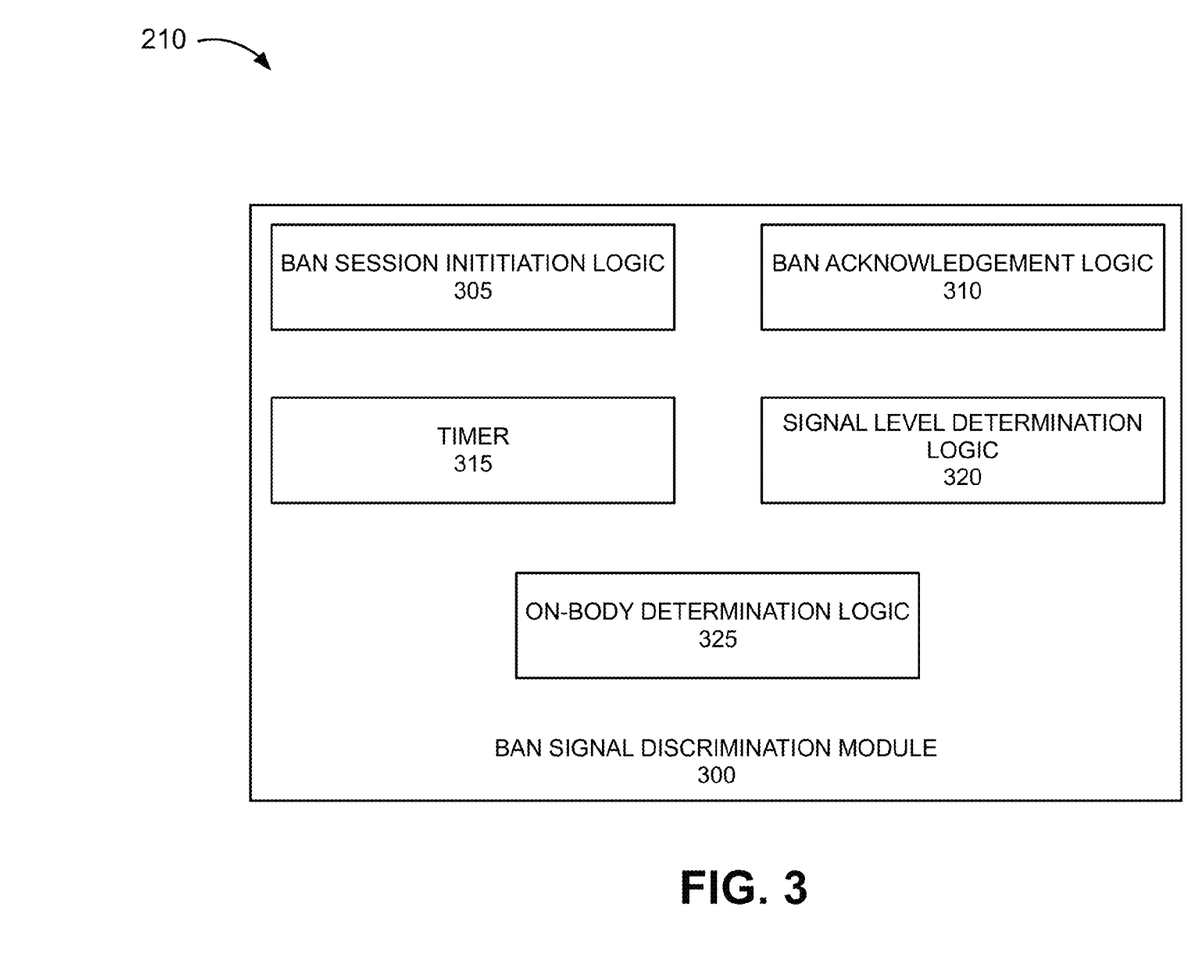
FIG. 3 is a diagram illustrating an exemplary functional block diagram of a BAN signal discrimination module consistent with embodiments described herein.

FIG. 3 is a diagram illustrating an exemplary functional block diagram of a BAN signal discrimination module 300 consistent with embodiments described herein. BAN signal discrimination module 300 may be implemented, for example, via processing unit 210 of communication device 100 or secondary BAN device 150 executing instructions stored in memory/storage 210. Alternatively, some or all of the functionality of BAN discrimination module 300 may be implemented via hard-wired circuitry.

As shown in FIG. 3, BAN signal discrimination module 300 may include BAN session initiation logic 305, BAN acknowledgement logic 310, timer 315, signal level determination logic 320, and on-body determination logic 325.

BAN session initiation logic 305 is configured to output BAN session initiation request signals via BAN transceiver 222, BAN antenna 224, and BAN contact 130 (collectively referred to as the BAN interface). In particular, BAN session initiation logic 305 may be configured to output a BAN session initiation request signal when the body sensor in BAN contact 130 determines on-body contact or when another triggering event occurs (e.g., from software 215). BAN session initiation logic 305 is further configured to receive BAN acknowledgement signals (responsive to the BAN session initiation request) via BAN contact 130.

In some implementations, the BAN session initiation signal may include data identifying the requesting device or the service to be performed via BAN. Similarly, the BAN acknowledgement signal may include data identifying a responding device and its supported services. However, in other embodiments, the session initiation signal and acknowledgement signals are merely short burst signals at a particular frequency to which other BAN devices are configured to respond.

BAN acknowledgement logic 310 is configured to receive and recognize a BAN session initiation request signal, via the BAN interface, and output a BAN session acknowledgement signal confirming receipt of the signal. More specifically, BAN acknowledgement logic 305 may be configured to output the BAN session acknowledgement signal via BAN contact 130 in the receiving device. Similar to the BAN session initiation signal, in some implementations, the BAN acknowledgement signal also includes data identifying the acknowledging device to the requesting device.

As described above, in some implementations, receipt of the BAN signals (such as the BAN session initiation request signal or the BAN acknowledgement signal) are received at the BAN interface via over the air transmission, rather than via the body of a user to which both devices are coupled. To minimize the possibility that information is erroneously or unintentionally transmitted over the air, BAN signal discrimination module 300 is configured to determine whether a BAN acknowledgement signal has been received over the body, as described below.

Timer 315 is configured to determine and store an amount of time elapsed between the output of the BAN session initiation signal and the receipt of one or more BAN acknowledgement signals. Signal level determination logic 320 is configured to determine and store the signal level or strength for each received BAN acknowledgement signal.

On-body determination logic 325 is configured to determine whether the device that returned one or more BAN acknowledgements signals (e.g., communication device 100) is coupled to the same body as the device that transmitted the BAN session initiation request signal (e.g., secondary BAN device 150).

To make such a determination, several technical aspects have been identified that inform on such a determination. For example, the speed of the over-the-air signals may be approximated as the speed of light, which is approximately c=30.0 centimeters per nanosecond (ds/ns). However, at 27 MHz, for example, human tissue has a dielectric constant of 95. Thus, the speed of light through human skin may be approximated as $v = c/\sqrt{95}$, which is approximately 3 cm/ns or ten times slower than the same signal radiated through the air. Accordingly, it has been determined that the time taken to receive a BAN acknowledgement signal is indicative of whether the transmitting device is on the same body as the receiving device.

More specifically, it has been determined that radiated signals receivable by BAN receivers must be located within approximately one meter from the transmitting device, and more reasonably within 0.5 meters. For such signals, BAN acknowledgement signals typically have a response time of less than 6 ns (plus any delay for the other unit to receive the BAN session initiation signal and initiate transmission of the BAN acknowledgement signal), based on the above-described rationale. For simplicity, the maximum time for an over-the-air BAN acknowledgement signal may be referred to as $t_0$. Thus, it has been determined that when a BAN acknowledgement signal has been received and that signal has been received in a time greater than $t_0$, then it may be concluded that the devices are on the same body and may form the basis for an ensuing BAN session.

Although the above determinations may inform as to the body coupled nature of an acknowledging device when only BAN acknowledgement signal is received beyond the threshold time period, it does not inform when a BAN acknowledgement signal is not received in the short $t_0$ time period. For example, if two devices are separated by only 6 cm on a body, both the radiated and over-the-body BAN acknowledgement signals would be received within time $t_0$, thus rendering it unclear whether the devices are on the same body, or whether the signals represent over-the-air responses from two different devices, neither of which are on the user's body.

To inform on this scenario, it has been determined that the level of a radiated signal (over the air) generally decreases or attenuates with distance as at least $1/d^2$ (and as $1/d^4$ for a very narrow field), while the level of a signal passing through a body attenuates much more gradually as $1/d$. As used herein the term "level" is used synonymously with the terms power, strength, and amplitude.

Based on these principals, it has been determined that the level of received BAN acknowledgement signals may also be used to inform as the nature of the acknowledging device. More specifically, when the level of received BAN acknowledgement signal is greater than a threshold level, $L_0$, the devices are considered to be on the same body, irrespective of whether the time for response is greater than time $t_0$. As described herein, the threshold signal level $L_0$ may correspond to minimum level of a conducted signal having a response time less than or equal to $t_0$.

Returning to FIG. 3, consistent with the above description, on-body determination logic 325 may compare, for each BAN acknowledgment signal received, the response times stored by timer 315 to the threshold time $t_0$ and the signal levels stored by signal level determination logic 320 to the threshold level $L_0$. If either a time exceeds $t0$ or a level exceeds $L0$, on-body determination logic 325 determines that the BAN acknowledgment signal is received from an on-body device.

In an alternative implementation, on-body determination logic 325 may also base the on-body determination on a number of BAN acknowledgement signals received. In such an embodiment, a number of recent entries stored by timer 315 or signal level determination logic 320 may be identified and used to supplement the determination described above. For example, on-body determination logic 325 may determine, when a BAN acknowledgement signal has a level greater than $L0$, whether more than one BAN acknowledgement signal has been received. Thus, only when more than one BAN acknowledgement signal has been received having a signal level that is greater than $L_0$ would an on-body device determination be made. This protects against scenarios in which a very close proximity over-the-air device responds and no on-body device responds.

Figure 4A:
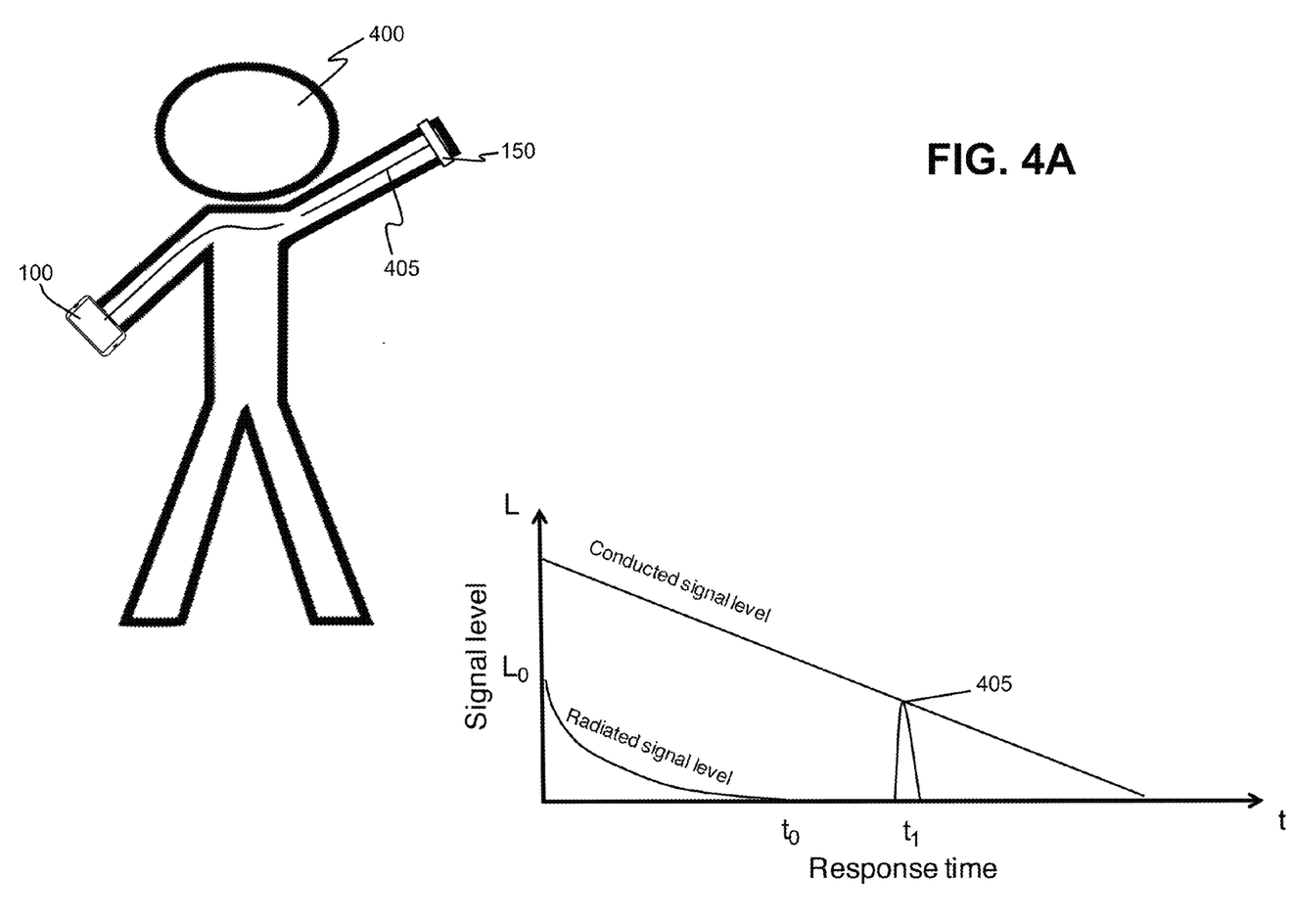
FIG. 4A-4E illustrate exemplary scenarios pertaining to the BAN signal discrimination module of FIG. 3.

FIGS. 4A-4E illustrate exemplary scenarios pertaining to the BAN signal discrimination module 300 described above. It may be assumed that each device described in relation to FIGS. 4A-4E supports BAN signal discrimination in this manner. Referring to FIG. 4A, assume that a user 400 is contacting a communication device 100 (e.g., a smartphone) in their right hand and is wearing a secondary BAN device 150 (e.g., a BAN-enabled fitness band) on their left wrist. As shown in FIG. 4A, further assume that the user has picked up device 100 while simultaneously reaching out oppositely with their left hand, thus creating a maximum air distance between device 100 and secondary BAN device 150 (approximately 1.5-2 meters). Assume that device 100, upon being picked up by user 400, transmits a BAN session initiation signal to secondary BAN device 150 in the manner described above. However, as shown in FIG. 4A, because the over the air distance between device 100 and device 150 is large, communication device 100 does not receive a radiated BAN acknowledgement signal and only receives a conducted (e.g., over the body) BAN acknowledgement signal. The signal path for the conducted BAN signals is represented by dashed line 405.

To illustrate the effects of time on the resulting BAN acknowledgment signals (or signals) received from secondary BAN device 150, FIG. 4A includes a graph of signal level to time for both the on-body BAN acknowledgement signal and the radiated BAN acknowledgement signal, to the extent they are both received. To further illustrate expected signal attenuation over time, the graph further depicts, as a reference, the standard $1/d$ attenuation of an on-body signal and the $1/d^2$ attenuation of the radiated signal.

Due to the on-body distance between device 100 and device 150, the conducted BAN acknowledgement signal received via path 405 is received at time $t_1 > t_0$. Thus, as described above, because a BAN acknowledgement signal was received after an elapsed time longer than the threshold time $t_0$ (i.e., the maximum response time for a radiated BAN acknowledgement signal), on-body determination logic 325 can accurately determine that the received BAN acknowledgement signal is indicative of an on-body device.

Figure 4B:
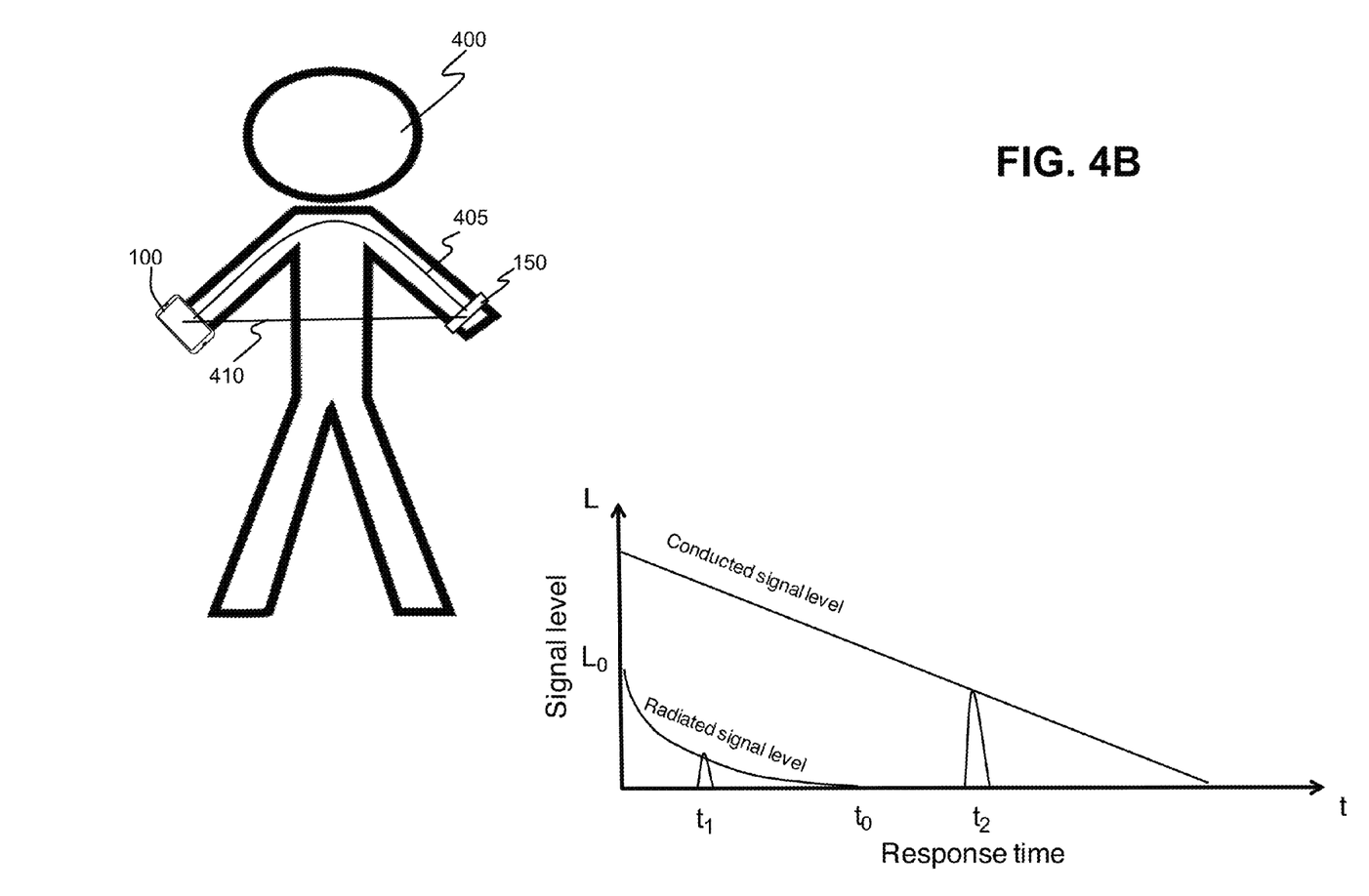

Referring to FIG. 4B, assume that a user 400 is again contacting a communication device 100 (e.g., a smartphone) in their right hand and is wearing a secondary BAN device 150 (e.g., a BAN-enabled fitness band) on their left wrist. However, in contrast to the example of FIG. 4A, assume that the user has picked up device 100 at a time in which their left hand is closer to the right hand, thus creating a shorter air distance between device 100 and secondary BAN device 150 (approximately 0.5 meters). Again assume that device 100, upon being picked up by user 400, transmits a BAN session initiation signal to secondary BAN device 150 in the manner described above. As shown in FIG. 4B, because the over the air distance between device 100 and device 150 is shorter than in FIG. 4A, communication device 100 receives both a radiated BAN acknowledgement signal as well as a conducted BAN acknowledgement signal. The signal path for the conducted BAN signals is again represented by dashed line 405 and the signal path for the radiated BAN signals is represented by dashed line 410 in a different dashed style.

Due to the over the air distance between device 100 and device 150, the radiated BAN acknowledgement signal received via path 410 is received at time $t_1 < t_0$, while the conducted BAN acknowledgement signal received via path 405 is received at time $t_2 > t_0$. Thus, as described above, because a BAN acknowledgement signal was received after an elapsed time longer than the threshold time $t_0$, on-body determination logic 325 can again accurately determine that the received BAN acknowledgement signal is indicative of an on-body device, irrespective of the received radiated signal because it has been determined that only body conducted response signals are received at such a delay.

Figure 4C:
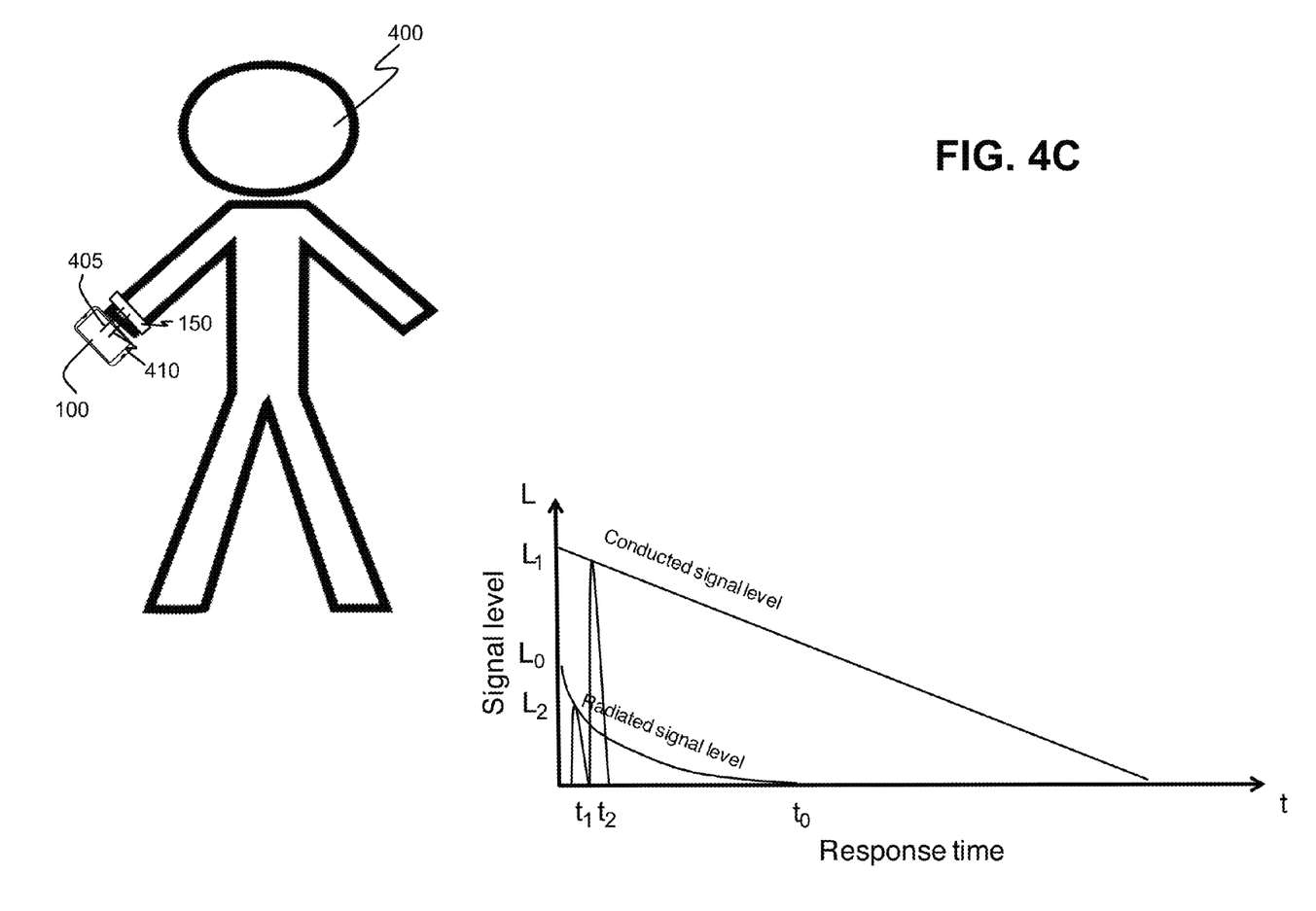

Referring to FIG. 4C, assume that a user 400 is contacting communication device 100 in their right hand and is wearing secondary BAN device 150 on their right wrist. Assume that the user has picked up device 100, thus creating a very short air and conducted distance between device 100 and secondary BAN device 150 (e.g., approximately 5 cm). Again assume that device 100, upon being picked up by user 400, transmits a BAN session initiation signal to secondary BAN device 150 in the manner described above.

Due to the much shorter over-the-air and on-body distances between device 100 and device 150, both the radiated BAN acknowledgement signal received via path 410 and the conducted BAN acknowledgement signal received via path 405 are received at times $t_1$ and $t_2<t_0$. Thus, as described above, because both BAN acknowledgement signals are received before the threshold time $t_0$, on-body determination logic 325 cannot use time alone as a discriminating criterion. However, as shown in a graph illustrated in FIG. 4C, because the on-body distance between device 100 and device 150 is short, the level $L_1$ of the received conducted BAN acknowledgement signal is greater than the threshold level $L_0$. Thus, as described above, because a BAN acknowledgement signal was received that has a signal level greater than the threshold level $L_0$, on-body determination logic 325 can again accurately determine that the received BAN acknowledgement signal is indicative of an on-body device, irrespective of the timings of the received signals.

Figure 4D:
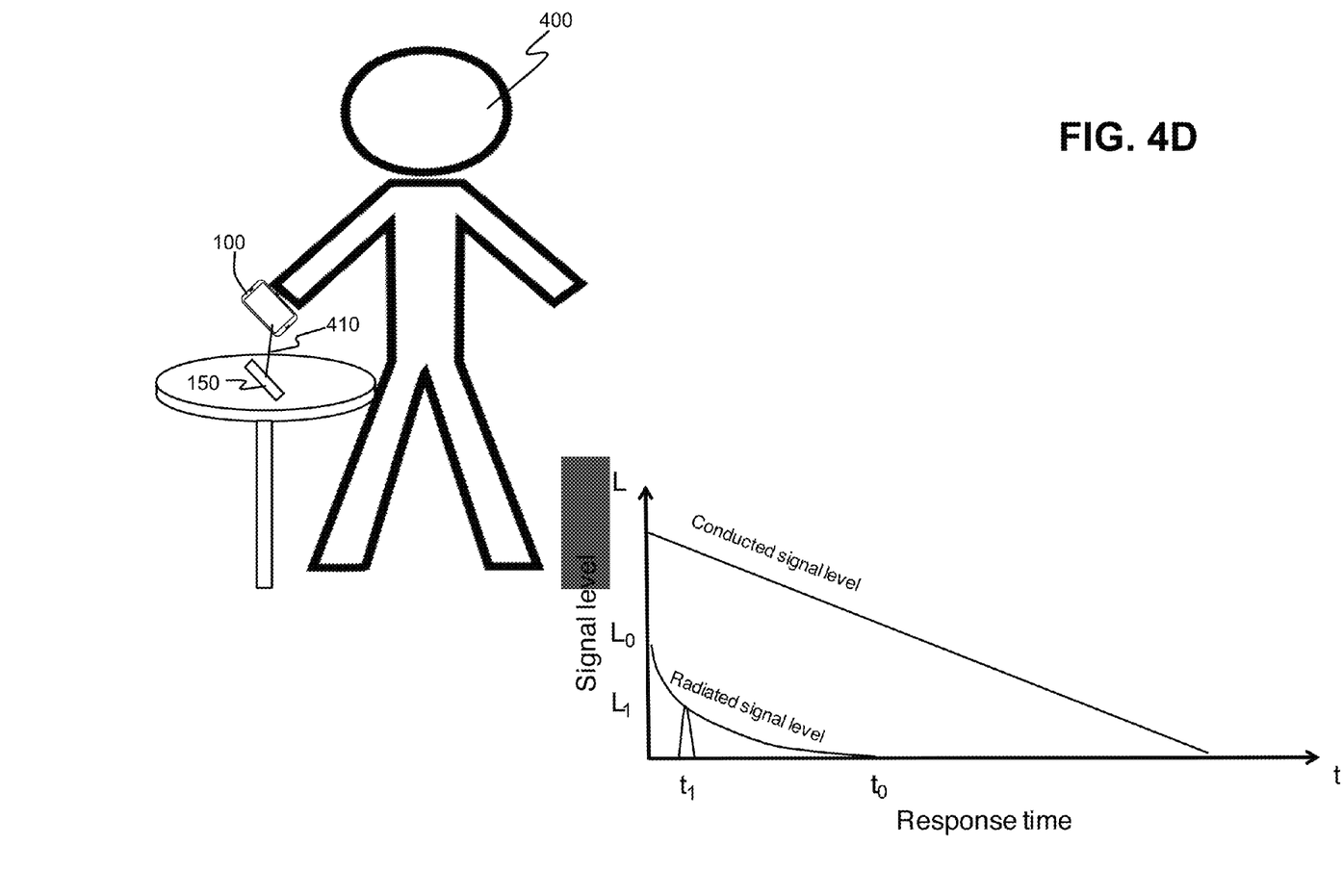

Referring to FIG. 4D, assume that a user 400 is now contacting communication device 100 in their right hand and that secondary BAN device 150 is not on body, but is in close physical proximity to device 100. Again assume that device 100, upon being picked up by user 400, transmits a BAN session initiation signal to secondary BAN device 150 in the manner described above.

Because secondary BAN device 150 is not contacting the body of user 400, device 100 does not receive a conducted BAN acknowledgement signal. However, the close proximity to secondary BAN device 150 results in the receipt of a radiated BAN acknowledgement signal via path 410. As shown in a graph illustrated in FIG. 4D, the distance between device 100 and secondary BAN device 150 is such that the signal level $L_1$ of the received radiated BAN acknowledgement signal is less than the threshold level $L_0$. Furthermore, the time $t_1$ of the received signal is less than the threshold time $t_0$. Based on these criteria, on-body determination logic 325 can accurately determine that the received BAN acknowledgement signal is not indicative of an on-body device.

Figure 4E:
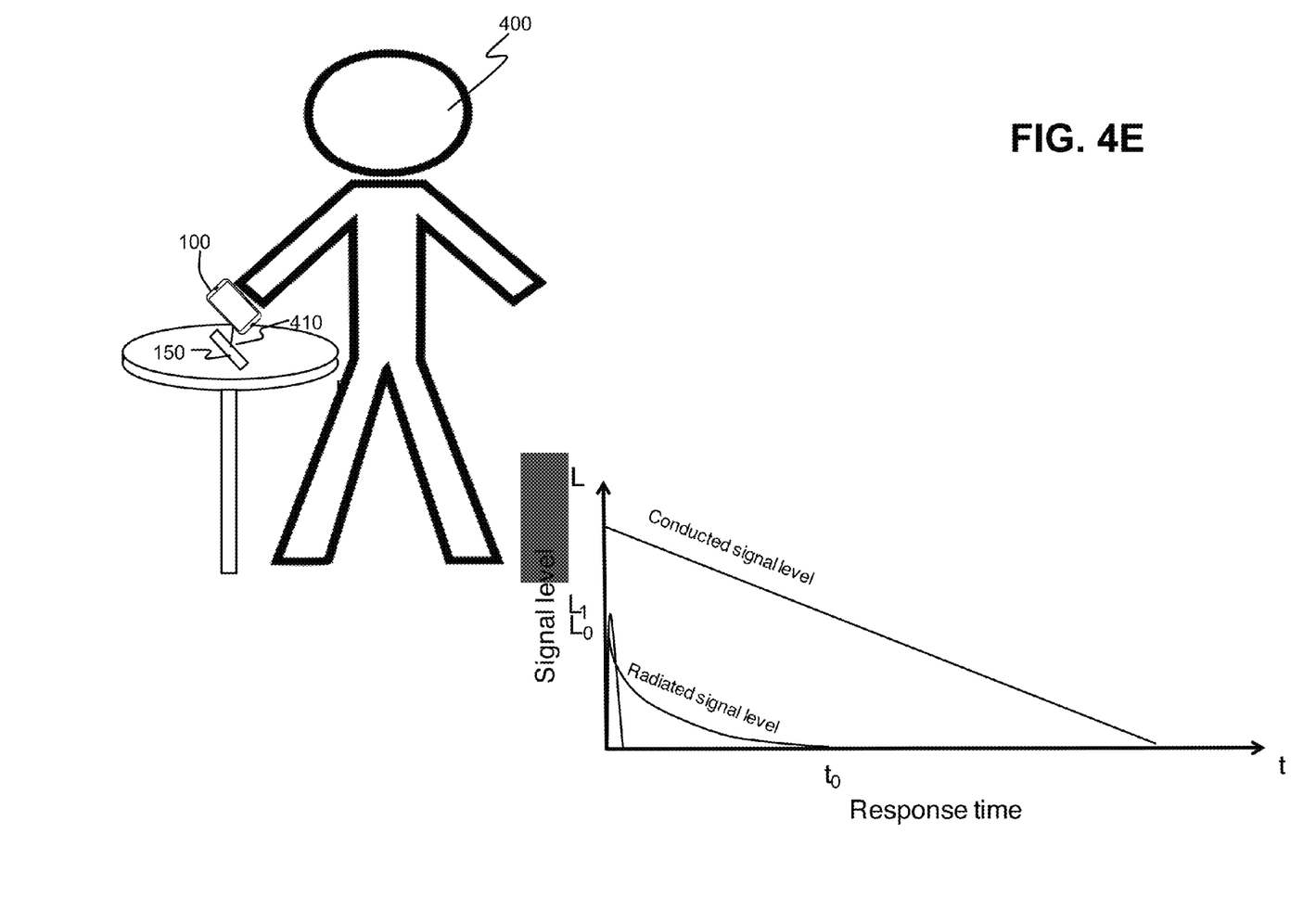

Referring to FIG. 4E, assume that a user 400 is again contacting communication device 100 in their right hand and that secondary BAN device 150 is not on body, but is in even closer physical proximity to device 100. Again assume that device 100, upon being picked up by user 400, transmits a BAN session initiation signal to secondary BAN device 150 in the manner described above.

Because secondary BAN device 150 is not contacting the body of user 400, device 100 does not receive a conducted BAN acknowledgement signal. However, the very close proximity (e.g., <5 cm) to secondary BAN device 150 results in the receipt of a high signal level radiated BAN acknowledgement signal via path 410. As shown in a graph illustrated in FIG. 4E, the distance between device 100 and secondary BAN device 150 is such that the signal level $L_1$ of the received radiated BAN acknowledgement signal is greater than the threshold level $L_0$. Furthermore, the time $t_1$ of the received signal is less than the threshold time $t_0$. Based on these criteria, on-body determination logic 325 may inaccurately determine that the received BAN acknowledgement signal is indicative of an on-body device based on only the signal level and the response time.

Accordingly, as described above, to protect against such erroneous determinations, the supplemental criteria of counting the number of received BAN acknowledgement signals may be used to further ensure accurate determination of a same body contact. In particular, in this instance, because only one BAN acknowledgment is received and that BAN acknowledgement signal has a level greater than $L_0$, on-body determination logic 325 may determine that that communication device 100 and secondary BAN device 150 are not on the same body and no BAN session is initiated.

Figure 5:
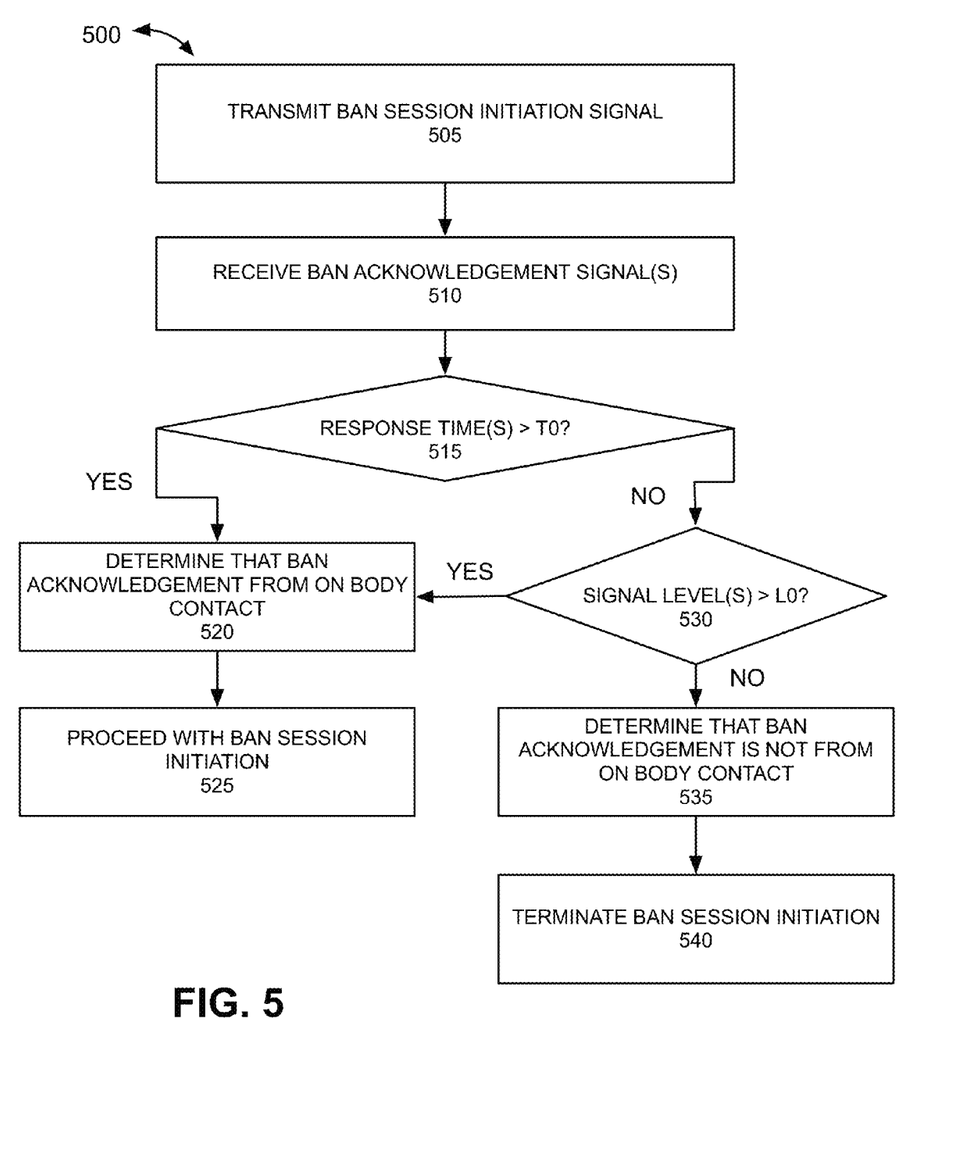
FIG. 5 is a flow diagram of an exemplary process for accurately determining an on body BAN device contact consistent with embodiments described herein.

FIG. 5 is a flow diagram of an exemplary process 500 for accurately determining an on body BAN device contact. A block or act of process 500 may performed by BAN signal discrimination module 300 of a BAN communication device, such as communication device 100 and/or secondary BAN device 150. For example, processor 205 may execute software 215 to provide the functionality of BAN signal discrimination module 300. Additionally, a block or act may be performed by BAN transceiver 222 or some combination thereof. As an initial point, assume that a triggering event has occurred that causes the transmission of a BAN session initiation signal.

For example, process 500 may be performed when BAN contact 130 of a BAN communication device detects a body contact. Additionally, process 500 may be performed according to other environments in which on-body communication between BAN communication devices is performed (e.g., between two users, a user and a BAN communication device not worn or carried by the user, etc.).

Process 500 may begin when a BAN session initiation signal is transmitted via BAN contact 130 (block 505). For example, BAN session initiation logic 305, upon a determination that BAN contact 130 is contacting a body or some other type of triggering event (e.g., software 215), may cause BAN transceiver 222 to output a BAN session initiation signal via BAN contact 130.

One or more BAN acknowledgement signals may be received via BAN contact 130 (block 510). More specifically, BAN acknowledgement logic 310 may be configured to receive the one or more BAN acknowledgement signals. Next, it may be determined whether a response time of one of the BAN acknowledgement signals is greater than threshold time $t_0$ (block 515). For example, on-body determination logic 325 may compare the response times of the received BAN acknowledgement signals stored by timer 315 to threshold time $t_0$. If the response time of one of the BAN acknowledgement signals is greater than threshold time $t_0$ (block 515—YES), it may be determined that the BAN acknowledgment signal is received from an on-body device (block 520). BAN session initiation may then proceed (block 525).

However, if it is determined that a response time of one of the BAN acknowledgement signals is not greater than threshold time $t_0$ (block 515—NO), it is determined whether a signal level of one of the BAN acknowledgement signals is greater than threshold signal level $L_0$ (block 530). For example, on-body determination logic 325 may compare the signal levels of the received BAN acknowledgement signals stored by signal level determination logic 320 to threshold signal level $L_0$. If the signal level of one of the BAN acknowledgement signals is greater than threshold signal level $L_0$ (block 530—YES), processing proceeds to block 520 where it is determined that the BAN acknowledgment signal is received from an on-body device.

However, if it is determined that a signal level of one of the BAN acknowledgement signals is not greater than threshold signal level $L_0$ (block 530—NO), it is determined that the BAN acknowledgment signal is not received from an on-body device (block 535) and BAN session initiation may be terminated (block 540). In some implementations, rather than terminating BAN session initiation, the process may return to block 505 for one or more additional attempts.

Although FIG. 5 illustrates an exemplary process 500, according to other embodiments, process 500 may comprise additional operations, fewer operations, and/or different operations than those illustrated in FIG. 5 and described.

Turning to yet another exemplary embodiment, as previously described, on-body determination logic 325 may further utilize a count of a number of received BAN acknowledgement signals to inform regarding whether the BAN acknowledgment signal is received from an on-body device. For example, it may be determined that the BAN acknowledgment signal is received from an on-body device when all response times are less than threshold time $t_0$ and more than one BAN acknowledgment signals have been received. If only one BAN acknowledgment signal has been received and the response time is less than $t_0$, it is determined to not be from an on-body device, regardless of the signal level of the received signal.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings.

An embodiment can also be implemented through computer readable code/instructions stored by a storage medium. A storage medium may comprise one or more of the storage media described above in relation to memory/storage 310. The storage medium may also comprise data and/or information, such as a data file, a data structure, and software, such as a program module, an application, etc. Computer readable code may comprise both machine code, such as produced by a compiler, and files comprising higher level code that may be executed by a computational device using, for example, an interpreter.

The flowcharts and blocks illustrated and described with respect to FIG. 5 illustrates exemplary processes according to an exemplary embodiment. However, according to other embodiments, the function(s) or act(s) described with respect to a block or blocks may be performed in an order that is different than the order illustrated and described. For example, two or more blocks may be performed concurrently, substantially concurrently, or in reverse order, depending on, among other things, dependency of a block to another block.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The term "logic" or "component," when used in the specification may include hardware (e.g., processor 205) or a combination of hardware and software (software 215). The embodiments have been described without reference to the specific software code since software can be designed to implement an embodiment based on the description herein and the accompanying drawings.

The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the use of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

No element, act, or instruction disclosed in the specification should be construed as critical or essential to the embodiments described herein unless explicitly described as such.

What is claimed is:

1. A method comprising:
   transmitting, by a first device, a body area network (BAN) session initiation signal indicating an availability to establish an on-body communication with a second device;
   receiving, by the first device, at least one BAN acknowledgement signal from the second device;
   determining an elapsed time between the transmission of the BAN session initiation signal and the receipt of the at least one BAN acknowledgment signal;
   determining, for each received BAN acknowledgment signal, one of:
      that the elapsed time is greater than a predetermined threshold time, or;
      that the elapsed time is equal to or less than the predetermined threshold time;
   wherein the predetermined threshold time indicates a period of time under which the at least one BAN signal is considered to have propagated by over-the-air transmission, and over which the at least one BAN signal is considered to have propagated by on-body conduction; and
   proceeding, by the first device, with BAN session initiation upon a positive determination that the elapsed time is greater than the threshold time.

2. The method of claim 1, wherein transmitting the BAN session initiation signal further comprises outputting the BAN session initiation signal via a BAN contact of the first device.

3. The method of claim 2, wherein receiving the BAN acknowledgement signal further comprises receiving the BAN acknowledgement signal via the BAN contact of the first device.

4. The method of claim 1, wherein the predetermined threshold time comprises a time that corresponds to a maximum response time for a detectable radiated BAN acknowledgment signal.

5. The method of claim 1, further comprising:
   determining a number of signals of the at least one BAN acknowledgment signal;
   determining and storing a signal strength of the received at least one BAN acknowledgment signal; and
   upon a determination that the elapsed time is less than the threshold time, performing the further steps of:

determining, for each received BAN acknowledgment signal, one of:
  that the determined signal strength is greater than or equal to a predetermined signal strength, or;
  that the determined signal strength is less than the predetermined signal strength.

6. The method of claim 5, wherein, upon a determination that the determined signal strength of each of the received BAN acknowledgment signals is greater than or equal to the predetermined signal strength, performing the additional steps of:
  evaluating the determined number of signals to determine one of:
    that there is one signal; or
    that there is a plurality of signals;
  proceeding with BAN session initiation when it is determined that there is a plurality of signals; and
  terminating BAN session initiation when it is determined that there is one signal.

7. The method of claim 5, wherein the predetermined signal strength comprises a minimum strength of a signal conducted across a body.

8. A device comprising:
  a body area network (BAN) communication interface;
  a memory, wherein the memory stores instructions; and
  a processor, wherein the processor is configured to execute the instructions to:
    transmit, via the BAN communication interface, a BAN session initiation signal indicating an availability to establish an on-body communication with a second device;
    receive, via the BAN communication interface, at least one BAN acknowledgement signal from the second device;
    determine an elapsed time between the transmission of the BAN session initiation signal and the receipt of the at least one BAN acknowledgment signal;
    determine, for each received BAN acknowledgment signal, one of:
      that the elapsed time is greater than a predetermined threshold time; or
      that the elapsed time is equal to or less than the predetermined threshold time;
    wherein the predetermined threshold time indicates a period of time under which the at least one BAN signal is considered to have propagated by over-the-air transmission, and over which the at least one BAN signal is considered to have propagated by on-body conduction; and
    proceed with BAN session initiation upon a positive determination that the elapsed time is greater than or equal to the threshold time.

9. The device of claim 8, wherein the BAN communication interface comprises:
  a transmitter;
  a receiver;
  an antenna coupled to the transmitter and the receiver;
  a contact coupled to the antenna; and
  a sensor configured to determine when a body engages the contact.

10. The device of claim 8, wherein the predetermined threshold time comprises a time that corresponds to a maximum response time for a detectable radiated BAN acknowledgment signal.

11. The device of claim 8, wherein the processor is further configured to execute the instructions to:
  determine a number of signals of the at least one BAN acknowledgment signal;
  determine a signal strength of the received at least one BAN acknowledgment signal; and
  wherein, upon a determination that the elapsed time is less than the threshold time, the processor is further configured to carry out the instructions to:
    determine, for each received BAN acknowledgment signal, one of:
      that the determined signal strength is greater than or equal to a predetermined signal strength; or
      that the determined signal strength is less than the predetermined signal strength.

12. The device of claim 11, wherein, upon a determination that the determined signal strength of each of the received BAN acknowledgment signals is greater than or equal to the predetermined signal strength, the processor is further configured to execute the instructions to:
  evaluate the determined number of signals to determine one of:
    that there is one signal; or
    that there is a plurality of signals;
  proceed with BAN session initiation upon a determination that there is a plurality of signals; and
  terminate BAN session initiation upon a determination that there is one signal.

13. The device of claim 11, wherein the predetermined signal strength comprises a minimum strength of a signal conducted across a body.

* * * * *